United States Patent Office 3,836,649
Patented Sept. 17, 1974

3,836,649
ECTOPARASITICIDAL COMPOSITIONS AND
PROCESS FOR THEIR PREPARATION
Otto Telle, Cologne, and Hans-Heinz Molls and Karl-Ernst Fetting, Leverkusen, Germany, assignors to Bayer Aktiengesellschaft, Leverkusen, Germany
No Drawing. Filed Feb. 16, 1973, Ser. No. 333,037
Claims priority, application Germany, Feb. 24, 1972,
P 22 08 618.6
Int. Cl. A61k 27/00; A61l 23/00
U.S. Cl. 424—203
4 Claims

ABSTRACT OF THE DISCLOSURE

Ectoparasiticidal aqueous suspensions of O,O-diethyl-O-(3-chloro - 4 - methylcoumarin-7-yl)thionophosphate which maintain their activity after repeated use are prepared by communiting the compound in an aqueous medium and in the presence of a dispersing agent to an average particle size of from about 0.3 to about $1.5\mu$ with 80% of the particles having a size less than $1\mu$.

DETAILED DESCRIPTION

The present invention relates to compositions continging the known ectoparasiticidal agent O,O-diethyl-O-(3-chloro - 4 - methylcoumarin-7-yl)thionophosphate and to a process for the preparation of such compositions.

For the ectoparasiticidal treatment of large numbers of animals, concentrates of the active ingredient are usually supplied in the form of wettable powders or emulsifiable or water-miscible solutions. These are then diluted to the desired concentration for use and the mixtures are then distributed over the skins of the animals either by means of a spray or by driving the animals through a dip bath.

It has been repeatedly shown however that the ectoparasiticide formulated in this way is removed from the spray liquids and dip liquids to a high degree, presumably because of its great affinity for the pelt of the animal. I. R. Harrison et al., J. Sci. Fd. Agric. 10, 568 (1959); I. R. Harrison et al., Ann. appl. Biol. 49, 588–600 (1961); G. E. Thompson and J. A. F. Baker, Jl. S. Afr. Vet. Med. Ass. 39, 61–67 (1968); D. K. O'Neill and S. P. Hebden, Austr. Vet. J. 44 344–349 (1968); A. N. Sinclair et al., Aust. Vet. J. 40, 44 (1964); D. K. O'Neill et al., Aust. Vet. J. 42, 207 (1966); S. P. Hebden et al. Aust. Vet. J. 43, 73 (1967).

A distinct drop in the concentration of the active compound in the spray liquid or bath liquid in the course of the treatment is observed; i.e. the concentration drops sharply from its initial value as soon as the first animals have passed through the bath. The concentration will eventually reach a constant, albeit considerably lower, value over the course of the further treatment, Thompson et al., J. S. Afr. Vet. Met. Ass., 39, 61–67 (1968) but this either is below the initial desirable level or requires use of an excessive concentration at the outset.

Checking the amount of active compound present in each case, so as to accurately judge parasiticidal action, is only possible by means of repeated analysis, in practice an inconvenient and expensive additional measure. Water hardness and degree of dirtiness will also greatly influence the extent to which the active compound is removed from the liquid.

The resulting fluctuation of active ingredient will of course represent a hazard to both the treated animal and to the treatment personnel. Consequently it has been the practice to add purely empirically determined amounts of active compound concentrate, either emulsion concentrate or wettable powder, after the first few animals have been treated.

The present invention provides a process for the production of an ectoparasiticidal suspension from which the active compound is not undesirably adsorbed on the skins of the animals treated with it. This is accomplished by comminuting the compound O,O-diethyl-(3-chloro-4-methylcoumarin-7-yl)thionophosphate in the presence of a liquid vehicle and a wetting or dispersing agent. As a result, the hydration of lyophobic parasiticide particles is materially improved, and because the interfacial tension between the vehicle and lipophilic particles is lowered, it is possible to manufacture a stable, highly concentrated suspension of the parasiticide which shows no sedimentation, no loss of content and a full parasiticidal action after repeated use.

The compositions produced by the process of the invention were not previously known for use in the field of dip and spray treatment of animals. Surprisingly, they show reduced adsorption of active compounds on the skin of the animals, as compared to previously known application forms. It can be demonstrated analytically that the active compound concentration in the dip bath remains substantially constant even after many animals have been treated. Thus the amount of active compound withdrawn and required for therapy is always a function of the amount of water carried away by the animal on its skin at the same time. The formulations thus obtained can be used in the ectoparasiticidal treatment of animals in dip baths, by the spray process or by application by rubbing in (spot on, pour on).

The invention thus also provides a method of combatting ectoparasites in domestic animals comprising applying the suspension of the invention, optionally after dilution, to the skin of the animals, preferably by dipping or by spraying.

The suspensions produced by the process of the invention preferably contain 20 to 60 parts, preferably 40 to 50 parts by weight, of active compound, 5 to 12 parts by weight of dispersion agent, 0 to 6 parts by weight of wetting agent, and water or a readily water-miscible solvent as the vehicle. They can also advantageously contain 0.5 to 2 parts by weight of anti-foaming agent and 0.2 to 2 parts by weight of one or more suspending auxiliaries. Preservatives can also be added.

The optimum average size of the suspended particles in the formulations according to the invention is between 0.3 and $1.5\mu$ and at least 80% should be smaller than $1\mu$.

Conventional ball mills, stirred ball mills and sand mills are suitable for comminuting the compounds to this particle size.

The following examples illustrate the process of the invention.

EXAMPLE 1

Eight parts of the sodium salt of the condensation product obtained from 1 mole of hydroxydiphenylsulfonic acid and 0.75 mole formaldehyde (dispersing agent) are dissolved in 51.5 parts of water with stirring. Forty parts of O,O-diethyl - O - (3 - chloro - 4 - methylcoumarin-7-yl)thionophosphate (hereinafter referred to as Compound I) are homogeneously distributed in this solution by vigorous stirring. The suspension is passed through a sand mill with an open grinding pot. Sand or glass beads can be used as grist and the dwell time required for adequate comminution of the active compound particles is 45 minutes.

EXAMPLE 2

Five parts of a ligninsulfonate (dispersing agent), 0.2 parts of carboxymethylcellulose (suspending auxiliary), 0.2% of preservative and 3 parts of alkylaryl polygylcol ether (wetting agent) are dissolved in 61.3 parts of demineralized water. To this is added 0.3 parts of the suspending auxiliary Veegum colloidal magnesium aluminum silicate and 30 parts of Compound I with stirring. The wet comminution to the desired particle size is carried out in a ball mill.

EXAMPLE 3

Six parts of alkylarylsulfonate (dispersing agent), 0.2 parts of preservative, 0.2 parts of carboxymethylcellulose (suspending auxiliary) and 1 part of silicone antifoaming agent are dissolved in 72.3 parts of demineralized water. In this solution 0.3 parts of the suspending auxiliary Veegum colloidal magnesium aluminum silicate and 20 parts of Compound I are homogeneously distributed by means of a high speed stirrer. The suspension is pretreated with a corundum disc mill and the fine grinding of the suspended particles is carried out in a stirred ball mill.

EXAMPLE 4

Four parts of sodium salt of the condensation product obtained from 1 mole of hydroxydiphenylsulfonic acid with 0.75 mole formaldehyde (dispersing agent), 4 parts of alkylaryl polyglycol ether, 0.2 parts of preservative and 1 part of antifoaming agent are dissolved in 59 parts of water. In this solution, 0.2 parts of the suspending auxiliary Veegum colloidal magnesium aluminum silicate and 50 parts of Compound I are homogeneously distributed by vigorous stirring. The suspension is pre-comminuted by means of a colloid mill and is subsequently brought to the desired fineness in a sand mill with a closed grinding pot, using a dwell time of 40 minutes.

In place of the condensation product obtained from hydroxydiphenylsulfonic acid and formaldehyde, ligninsulfonate and alkylarylsulfonates, one can employ fatty alcohol sulfonates, terpene alcohol sulfonates, naphthalene and alkylnaphthalene sulfonates, sulfates of ethoxylated alcohols, sulfated fatty esters and sulfosuccinates.

Other wetting agents in addition to alkylaryl polyglycol ether include alkylarylpolyglycol esters, ethoxylated alcohols, ethoxylated fatty acids and fatty esters, ethoxylated fatty monoglycerids and ethoxylated sorbitan derivatives.

Other suspending auxiliaries besides carboxymethylcellulose include carboxyethylcellulose, hydroxymethylcellulose, hydroxyethylcellulose.

What is claimed is:

1. A process for the preparation of a suspension of O,O-diethyl-O-(3-chloro - 4 - methylcoumarin - 7 - yl)thionophosphate in an aqueous carrier which is useful for the ectoparasiticidal treatment of animals, said suspension having an improved consistency of ectoparasiticidal activity after repeated use, which comprises comminuting from 20 to 60 parts by weight of solid O,O-diethyl-O-(3-chloro-4-methylcoumarin-7-yl)thionophosphate in the aqueous medium of the eventual suspension in the presence of from 5 to 12 parts by weight of a dispersing agent selected from the group consisting of the condensation product obtained from hydroxydiphenylsulfonic acid and formaldehyde, ligninsulfonate, an alkylarylsulfonate, a fatty alcohol sulfonate, a terpene alcohol sulfonate, naphthalene sulfonate, an alkylnaphthalene sulfonate, a sulfate ethoxylated alcohol, a sulfated fatty ester and a sulfosuccinate, and from 0 to 6 parts by weight of a wetting agent selected from the group consisting of an alkylarylpolyglycol ether, an alkylarylpolyglycol ester, an ethoxylated alcohol, an ethoxylated fatty acid, an ethoxylated fatty ester, an ethoxylated fatty monoglycerid and an ethoxylated sorbitan derivative, until the average particle size of the comminuted O,O-diethyl-O-(3-chloro-4-methylcoumarin-7-yl) - thionophosphate is from about 0.3 to about 1.5$\mu$, at least 80 percent thereof having a particle size less than 1$\mu$.

2. The process according to claim 1 wherein the aqueous medium also contains from 0.2 to 2 parts by weight of a suspending auxiliary selected from the group consisting of carboxyethylcellulose, carboxymethylcellulose, hydroxymethylcellulose and hydroxyethylcellulose.

3. The process according to claim 1 wherein said aqueous medium contains from 0.5 to 2 parts by weight of an antifoam agent.

4. An ecotoparasiticidal composition comprising an aqueous suspension of particles of a comminuted mixture of 20 to 60 parts by weight of O,O-diethyl-O-(3-chloro-4-methylcoumarin-7-yl)thionophosphate having an average particle size of from about 0.3 to about 1.5$\mu$, at least 80 percent therof having a size less than 1$\mu$, 5 to 12 parts by weight of a dispersing agent selected from the group consisting of the condensation product obtained from hydroxydiphenylsulfonic acid and formaldehyde, ligninsulfonate, an alkylarylsulfonate, a fatty alcohol sulfonate, a terpene alcohol sulfonate, naphthalene sulfonate, an alkylnaphthalene sulfonate, a sulfate ethoxylated alcohol, a sulfated fatty ester and a sulfosuccinate, and 0 to 6 parts by weight of a wetting agent selected from the group consisting of an alkylarylpolyglycol ether, an alkylarylpolyglycol ester, an ethoxylated alcohol, an ethoxylated fatty acid, an ethoxylated fatty ester, an ethoxylated fatty monoglycerid and an ethoxylated sorbitan derivative, said particles of active ingredient having been comminuted in the presence of the aqueous mixture of dispersing agent and wetting agent.

References Cited

Shifs et al., Chem. Abst, Vol. .75 (1971), pp. 87467c and 1053s.

SAM ROSEN, Primary Examiner